US012695675B2

(12) United States Patent

Schiattarella et al.

(10) Patent No.: US 12,695,675 B2

(45) Date of Patent: Jul. 28, 2026

(54) SYSTEMS AND METHODS FOR AUTOMATED NETWORKING RULE PRODUCTION

(71) Applicant: Advanced Micro Devices, Inc., Santa Clara, CA (US)

(72) Inventors: Enrico Schiattarella, San Jose, CA (US); Shrey Ajmera, San Jose, CA (US); Rajaram Balasubramanian Krishnamurthy, Austin, TX (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 18/645,246

(22) Filed: Apr. 24, 2024

(65) Prior Publication Data

US 2025/0337655 A1     Oct. 30, 2025

(51) Int. Cl.
*H04L 41/14* (2022.01)
*H04L 41/16* (2022.01)
*H04L 43/062* (2022.01)

(52) U.S. Cl.
CPC .............. *H04L 41/14* (2013.01); *H04L 41/16* (2013.01); *H04L 43/062* (2013.01)

(58) Field of Classification Search
CPC ..... H04L 43/062; H04L 41/14; H04L 43/026; H04L 45/46; H04L 63/20; H04L 63/0227; G06F 16/285; G06F 18/23
See application file for complete search history.

(56) References Cited

U.S. PATENT DOCUMENTS

| | | | |
|---|---|---|---|
| 10,318,886 B2 | 6/2019 | Baradaran et al. | |
| 10,491,575 B2 * | 11/2019 | Verzun ................... | H04L 9/0662 |
| 10,742,673 B2 * | 8/2020 | Tiagi ........................ | H04L 63/20 |
| 10,945,190 B2 | 3/2021 | Palmer et al. | |
| 11,184,359 B2 * | 11/2021 | Kliger ................... | G06F 18/214 |
| 11,336,534 B2 * | 5/2022 | Turner .................. | H04L 41/142 |
| 11,700,237 B2 * | 7/2023 | Miriyala ............. | H04L 41/0893 |
| 11,829,373 B2 * | 11/2023 | Long ................... | G06F 16/9535 |
| 11,973,775 B1 * | 4/2024 | dos Santos Lopes .. | G06F 9/451 |
| 12,177,069 B2 * | 12/2024 | Miriyala ................ | H04L 69/03 |
| 2014/0033267 A1 * | 1/2014 | Aciicmez ............... | H04L 63/20 |
| | | | 726/1 |

(Continued)

OTHER PUBLICATIONS

M. Ma, Z. Yu and B. Liu, "Automatic Generation of Network Micro-Segmentation Policies for Cloud Environments," 2023 4th International Seminar on Artificial Intelligence, Networking and Information Technology (AINIT), Nanjing, China, 2023, pp. 1-5, doi: 10.1109/AINIT59027.2023.10212857. (Year: 2023).*

(Continued)

*Primary Examiner* — Alex Tran

(57) ABSTRACT

The flow samples in a training set may be produced from a flow log, from an initial set of network rules, or from both. The flow samples may include header values for network flows and may be stored in a memory. A processor coupled to the memory may be configured for unsupervised and automatic networking rule production. The unsupervised and automatic rule production may include producing clusters of the flow samples and producing networking rules from the clusters, wherein each of the clusters may be used to produce one of the networking rules. An unsupervised learning algorithm may be used to produce the clusters.

21 Claims, 10 Drawing Sheets

(56)                    References Cited

U.S. PATENT DOCUMENTS

| | | | |
|---|---|---|---|
| 2022/0131835 A1* | 4/2022 | Fenton | H04L 63/1458 |
| 2024/0097999 A1 | 3/2024 | Sun et al. | |
| 2024/0291721 A1* | 8/2024 | Costante | G06F 16/285 |

OTHER PUBLICATIONS

Guha, Sudipto et al. "Robust Random Cut Forest Based Anomaly Detection On Streams", Proceedings of the 33rd International Conference on Machine Learning, New York, NY, USA, 2016, 10 pgs.

* cited by examiner

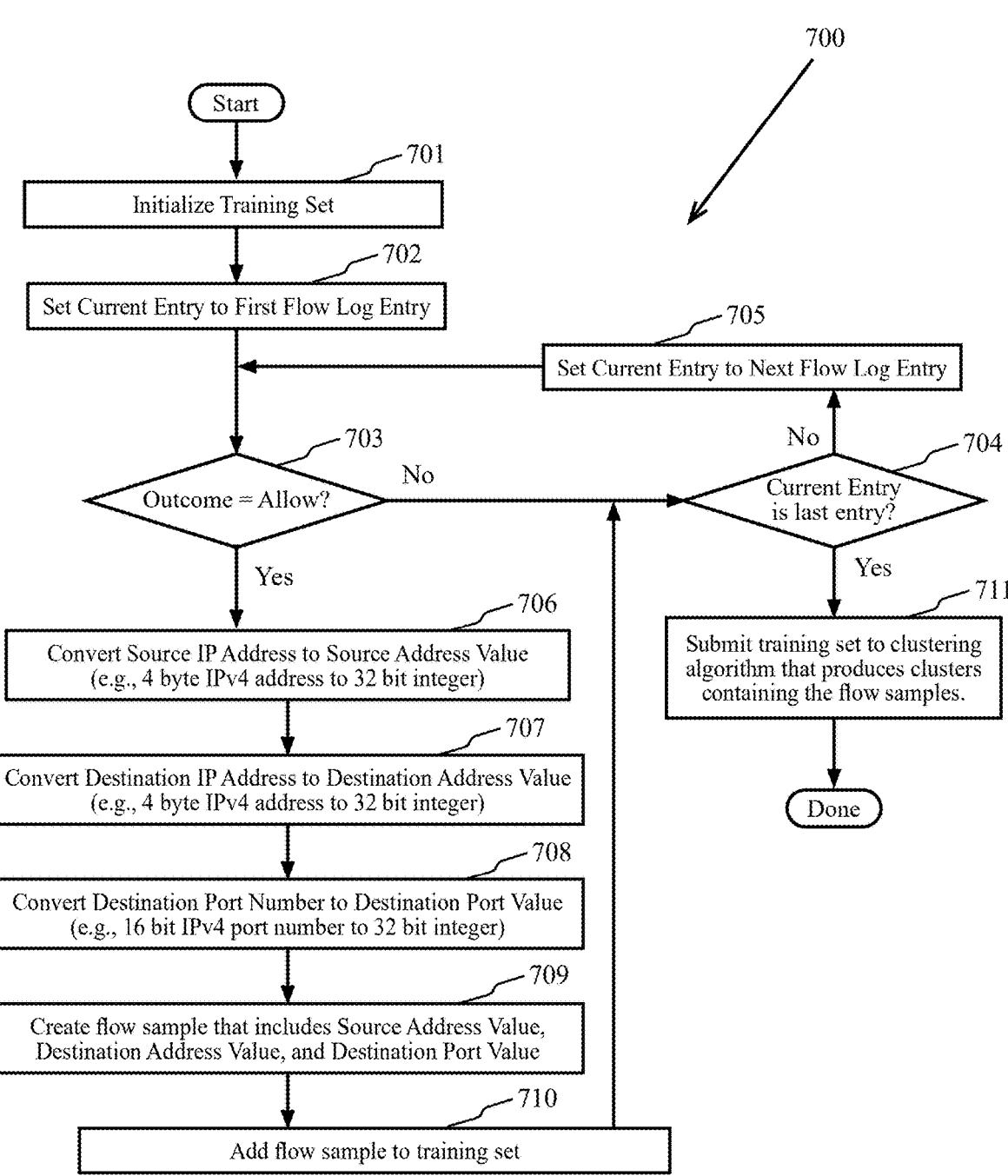

700

Start

701
Initialize Training Set

702
Set Current Entry to First Flow Log Entry

705
Set Current Entry to Next Flow Log Entry

703
Outcome = Allow?

No

704
Current Entry
is last entry?

No

Yes

Yes

706
Convert Source IP Address to Source Address Value
(e.g., 4 byte IPv4 address to 32 bit integer)

707
Convert Destination IP Address to Destination Address Value
(e.g., 4 byte IPv4 address to 32 bit integer)

708
Convert Destination Port Number to Destination Port Value
(e.g., 16 bit IPv4 port number to 32 bit integer)

709
Create flow sample that includes Source Address Value,
Destination Address Value, and Destination Port Value 710
Add flow sample to training set 711
Submit training set to clustering
algorithm that produces clusters
containing the flow samples.

Done

FIG. 7

SYSTEMS AND METHODS FOR AUTOMATED NETWORKING RULE PRODUCTION

TECHNICAL FIELD

The systems and methods relate to computer networks, routers, switches, distributed service cards (DSCs), network interface cards (NICs), smartNICS, networking rules, unsupervised learning, and clustering algorithms. The systems and methods also relate to automatically producing networking rules.

BACKGROUND

Data centers may have thousands of networking devices (e.g., routers, switches, DSCs, NICs, smartNICs, etc.) providing network connectivity for tens of thousands of host machines and possibly millions of virtual machines. The networking devices use networking rules to control the flows of network packets among the various hosts, virtual machines, and the outside world. One aspect of computer networks such as those in data centers may be that micro-segmentation of the networks may be implemented to allow only known communication patterns within the data-center while denying everything else. The number of networking rules required for implementing aspects such as micro-segmentation may be very large which may lead to issues such as network slowdowns or limiting the number of network flows that may be handled by the networking devices.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure as a prelude to the more detailed description that is presented later.

An aspect of the subject matter described in this disclosure may be implemented by a system device. The system may include a memory configured to store a plurality of flow samples, and a processor coupled to the memory, wherein the processor is configured to execute a plurality of executable instructions that implement unsupervised production of a plurality of networking rules, wherein producing the plurality of networking rules includes identifying a plurality of clusters of the flow samples, and producing the plurality of networking rules from the plurality of clusters, wherein each one of the plurality of clusters is used to produce one of the plurality of networking rules.

Yet another aspect of the subject matter described in this disclosure may be implemented in a method. The method may include identifying a plurality of clusters of a plurality of flow samples, and producing a plurality of networking rules from the plurality of clusters, wherein each of the plurality of clusters is used to produce one of the plurality of networking rules.

Another aspect of the subject matter described in this disclosure may be implemented by a system device. The system may include a clustering means for identifying a plurality of clusters of a plurality of flow samples, and a means for producing a plurality of networking rules from the plurality of clusters, wherein each one of the plurality of clusters is used to produce one of the plurality of networking rules.

In some implementations of the methods and devices, the flow samples include a plurality of flow header values for a plurality of network flows. In some implementations of the methods and devices, each of the plurality of flow samples includes a source address value, a destination address value, and a destination port value. In some implementations of the methods and devices, the processor is configured to use a clustering algorithm to identify the plurality of clusters. In some implementations of the methods and devices, the clustering algorithm is a K-means algorithm. In some implementations of the methods and devices, the clustering algorithm is a nearest-neighbor algorithm. In some implementations of the methods and devices, the clustering algorithm is a random cut forest algorithm. In some implementations of the methods and devices, the flow samples are samples of a plurality of network flows, and the plurality of networking rules are firewall rules that allow each of the network flows and that deny a network flow that is not one of the network flows. In some implementations of the methods and devices, the flow samples are samples of a plurality of network flows, and at least one of the plurality of flow samples are produced from a flow log that has an entry for each of the network flows. In some implementations of the methods and devices, at least one of the plurality of flow samples are produced from an initial networking rule set that includes a plurality of initial networking rules. In some implementations of the methods and devices, one of the plurality of initial networking rules indicates a range of values, and one of the plurality of flow samples includes a value that is a midpoint of the range of values. In some implementations of the methods and devices, the one of the plurality of flow samples matches one of the plurality of networking rules, and the one of the plurality of networking rules is adjusted to include the range of values.

In some implementations of the methods and devices, the flow samples include a plurality of flow header values of a plurality of network flows. In some implementations of the methods and devices, using a nearest-neighbor clustering algorithm to identify the plurality of clusters. In some implementations of the methods and devices, the flow samples are samples of a plurality of network flows, and the plurality of networking rules are firewall rules that allow each of the network flows and that deny a network flow that is not one of the network flows. In some implementations of the methods and devices, the flow samples are samples of a plurality of network flows, and at least one of the plurality of flow samples are produced from a flow log that has an entry for each of the network flows. In some implementations of the methods and devices, at least one of the plurality of flow samples are produced from an initial networking rule set that includes a plurality of initial networking rules. In some implementations of the methods and devices, one of the plurality of initial networking rules indicates a range of values, one of the plurality of flow samples includes a value that is a midpoint of the range of values, the one of the plurality of flow samples matches one of the plurality of networking rules, and the one of the plurality of networking rules is adjusted to include the range of values. In some implementations of the methods and devices, each of the plurality of flow samples indicates a point in a 3-dimensional space.

These and other aspects will become more fully understood upon a review of the detailed description, which follows. Other aspects and features will become apparent to those of ordinary skill in the art, upon reviewing the following description of specific examples in conjunction with the accompanying figures. While features may be discussed relative to certain examples and figures below, any example may include one or more of the advantageous features discussed herein. In other words, while one or more examples may be discussed as having certain advantageous features, one or more of such features may also be used in accordance with the various examples discussed herein. In similar fashion, while the examples may be discussed below as devices, systems, or methods, the examples may be implemented in various devices, systems, and methods.

BRIEF DESCRIPTION OF THE DRAWINGS

FIG. 7 is a high-level flow diagram illustrating an example of a process for identifying clusters from a training set produced from a flow log, according to some aspects.

Throughout the description, similar reference numbers may be used to identify similar elements.

DETAILED DESCRIPTION

Figure 1:
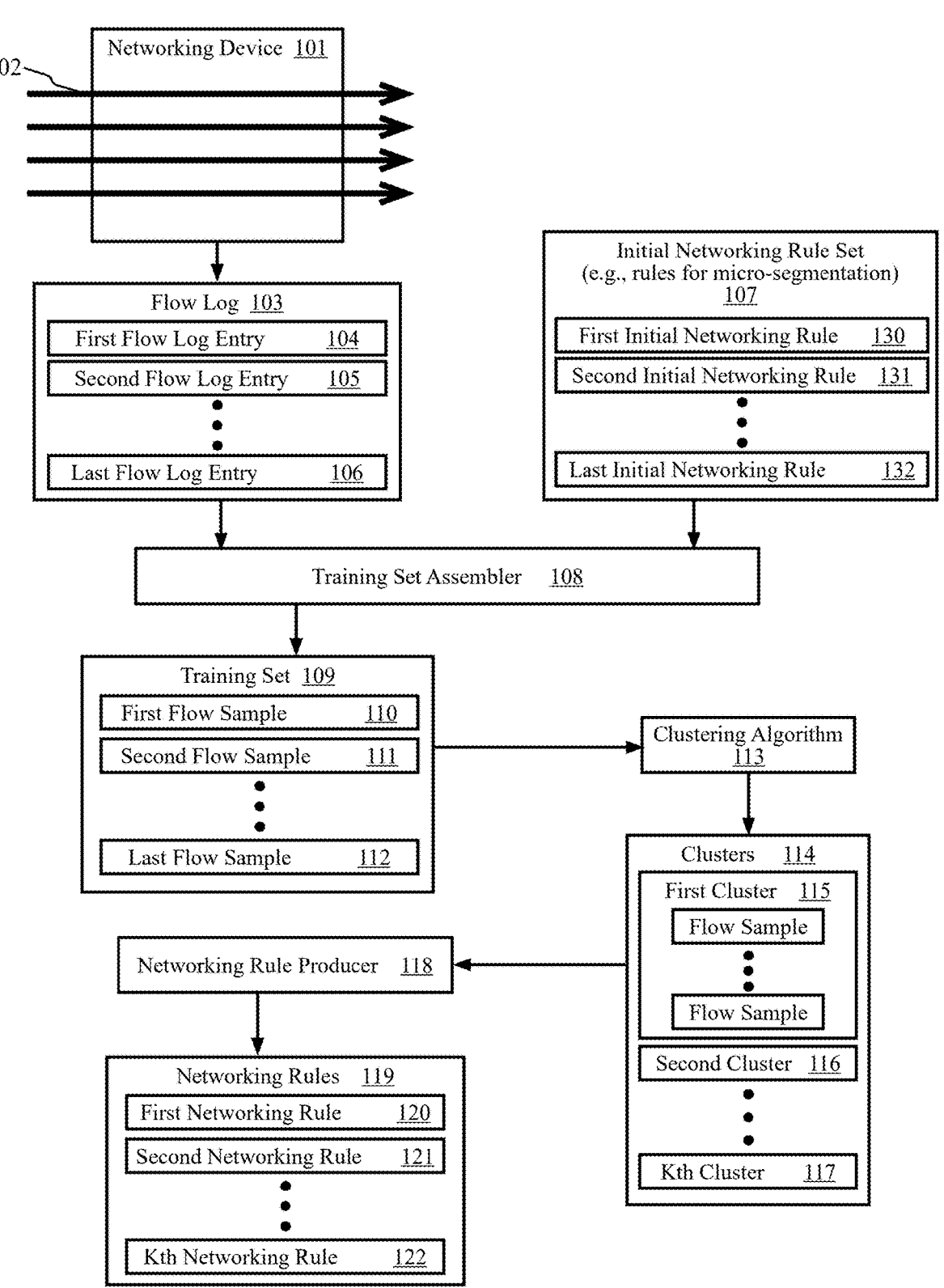
FIG. 1 is a high-level conceptual diagram illustrating an example of the unsupervised production of networking rules, according to some aspects.

It will be readily understood that the components of the examples as generally described herein and illustrated in the appended figures could be arranged and designed in a wide variety of different configurations. Thus, the following more detailed description of various examples, as represented in the figures, is not intended to limit the scope of the present disclosure, but is merely representative of various examples. While the various aspects of the examples are presented in drawings, the drawings are not necessarily drawn to scale unless specifically indicated.

Systems and methods that implement aspects may have various differing forms. The described systems and methods are to be considered in all respects only as illustrative and not restrictive. The scope of the claims is, therefore, indicated by the claims themselves rather than by this detailed description. All changes which come within the meaning and range of equivalency of the claims are to be embraced within their scope.

Reference throughout this specification to features, advantages, or similar language does not imply that any system or method implements each and every aspect that may be realized. Rather, language referring to the features and advantages is understood to mean that a specific feature, advantage, or characteristic described in an example may be implemented in or by at least one example. Thus, discussions of the features and advantages, and similar language, throughout this specification may, but do not necessarily, refer to the same example.

Furthermore, the described features, advantages, characteristics, and aspects may be combined in any suitable manner in one or more systems or methods. One skilled in the relevant art will recognize, in light of the description herein, that one example may be practiced without one or more of the specific features or advantages of another example. In other instances, additional features and advantages may be recognized in one example that may not be present in all the examples.

Reference throughout this specification to "one example", "an example", or similar language means that a particular feature, structure, or characteristic described in connection with the indicated example is included in at least one example. Thus, the phrases "in one example", "in an example", and similar language throughout this specification may, but do not necessarily, all refer to the same example.

The number of networking rules that networking devices may be required to implement may be growing larger for several reasons. One reason may be that networking devices may route traffic within increasingly large data centers. Another reason may be that some networking engineering techniques may result in large numbers of networking rules. One such technique may be micro-segmentation. Micro-segmentation may employ firewalls to restrict network traffic to a set of known and allowed flows. Micro-segmentation may enhance security by blocking suspicious flows at the expense of requiring large sets of networking rules. Such large rule sets may slow down software switches that use general purpose processors to make routing/switching decisions and to route network packets. The large rule sets may be too large to be fully implemented by hardware accelerated switches that use packet processing pipeline circuits to implement the rules.

Smaller networking rule sets may be automatically produced from initial networking rule sets or from flow logs. A flow log, an initial networking rule set, or both may be used to produce training data that a clustering algorithm analyzes to identify clusters in the training data. Networking rules may be automatically produced for each of the identified clusters. For example, a network engineer may want a set of K firewall rules, K being an integer. A training set may be produced from a flow log with entries for all the packets processed by a networking device over a period of time. A K-means clustering algorithm may be used to identify K clusters in the training set and K firewall rules may be produced, one for each cluster. The automatically produced set of firewall rules may block all or most of the traffic that would be blocked via micro-segmentation of the network.

Automatically producing networking rules based on the clusters identified by a clustering algorithm may result in sets of networking rules that are small enough to be implemented by networking devices without slowing down the device or exceeding the device's resource budget (e.g., allowed flow table size). The automatically produced rule set may not be as fine grained as an ideal rule set such as a rule set that perfectly micro-segments the network. For example, a firewall using automatically produced firewall rules may allow some network flows that are not required and that would be blocked by the ideal micro-segmentation rule set. As such, the security provided by the firewall may be realizable but not ideal. Those practiced in security understand realizable imperfect security may be far better than unrealizable perfect security.

FIG. 1 is a high-level conceptual diagram illustrating an example of the unsupervised production of networking rules, according to some aspects. As is well known in the art, a networking device 101 may process network flows 102 and may produce a flow log 103 that records the actions that the networking device 101 takes for each network packet in the network flows. The flow log 103 may include flow log entries such as a first flow log entry 104, a second flow log entry 105, a last flow log entry 106, and many entries between the second and the last. A training set assembler 108 may read the flow log 103 and create flow samples from the flow log entries. The flow samples may be stored in a training set 109. The training set 109 may include a first flow sample 110, a second flow sample 111, a last flow sample 112, and many more flow samples between the second and the last. Duplicate flow samples may be deleted from the training set or may be avoided by, for example, deleting or ignoring duplicate flow log entries. A clustering algorithm 113 may analyze the training set to identify clusters of flow samples. The output of the clustering algorithm may be a set of clusters 114. For example, the clustering algorithm may be the well-known K-means algorithm that partitions n observations (the flow samples) into k clusters in which each observation belongs to the cluster with the nearest mean. The parameter "k" may be input to the K-means algorithm such that the algorithm produces or identifies K clusters. The K-means algorithm may be well suited to the unsupervised production of networking rules when a specific number of networking rules may be desired. The desired number of networking rules may be based on a networking device's flow table size or the rate at which the networking device may identify the networking rule or rules that are to be applied to a network packet. The well-known K nearest-neighbor algorithm is a nearest-neighbor clustering algorithm that also produces k clusters where k may be a parameter input to the algorithm. Other clustering algorithms that may be used for identifying clusters in the training set include random cut forest algorithms. Random cut forest algorithms are a class of algorithms that are well known for their use in detecting outliers and therefore are well suited for the unsupervised production of firewall rules that may detect and block flows that are outliers relative to the training set.

The clusters 114 may include a first cluster 115, a second cluster 116, a Kth cluster 117, and many more clusters between the second and the Kth. For clarity, the clusters are shown including flow samples. The clusters may instead be one or more parameters that specify the cluster. For example, some K-means algorithms may produce K values that are the means (a.k.a. centroids) of clusters identified by the algorithm. Regardless of the output of the clustering algorithm, each of the flow samples may be in one of the clusters. A networking rule producer 118 may produce networking rules 119 from the clusters 114. Each cluster may be used to produce one of the networking rules. As such, K clusters may result in K networking rules. The networking rules 119 may include a first networking rule 120, a second networking rule 121, a Kth networking rule 122, and many more networking rules between the second and the Kth.

Flow samples may also be produced from an initial networking rule set 107 that may include a first initial networking rule 130, a second initial networking rule 131, and a last initial networking rule 132. The initial networking rule 107 set may be a set of networking rules such as a set of firewall rules for micro-segmentation. A networking device may limit sets of networking rules to a maximum allowable size such that the networking device may meet its required performance metrics. A networking rule set for micro-segmentation of the network may have a rule for each allowable network flow. Such a rule set may be larger than the networking device's maximum allowable size. A representative flow sample may be produced for every rule in the initial networking rule set and the representative flow samples may be included in the training set. As such, a set of K networking rules 119 may be produced from a prohibitively large initial networking rule set 107.

Figure 2:
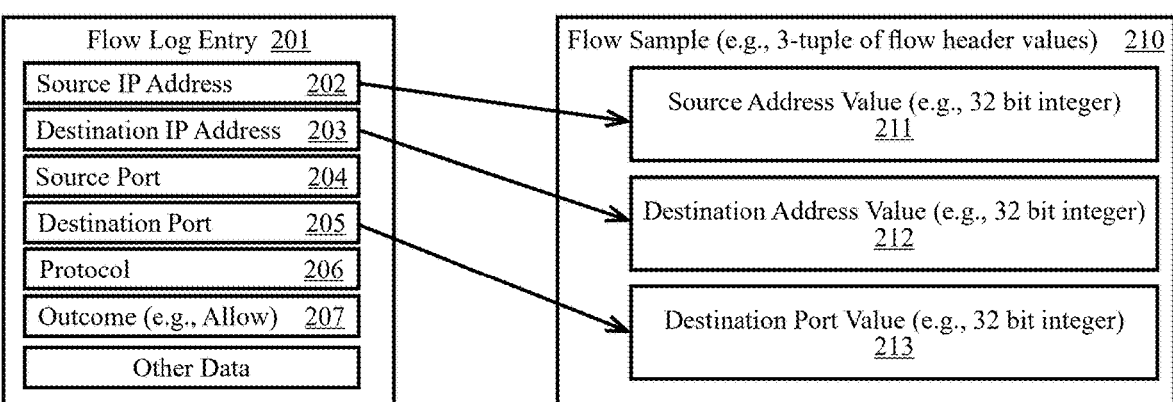
FIG. 2 is a high-level block diagram illustrating an example of a flow sample created from a flow log entry, according to some aspects.

FIG. 2 is a high-level block diagram illustrating an example of a flow sample 210 created from a flow log entry 201, according to some aspects. A networking device may create flow log entries for all or some of network packets that the networking device processes. A flow log entry may include a network packet's source internet protocol (IP) address 202, destination IP address 203, source port 204, destination port 205, and protocol 206 (sometimes called "next header") along with an outcome 207 that the networking device applies to the network packet. For example, in response to receiving the network packet, the networking device may search for a networking rule with a matching criterion that matches the network packet and may then apply the outcome indicated by the networking rule to the network packet. For example, the outcome of a firewall rule may be "allow" (let the packet through the firewall) or "deny" (drop the packet). In other examples, the outcome may be a quality of service value, a priority value, etc. IP addresses in flow logs may be shown as a series of octets or bytes that may need to be converted to numerical values because clustering algorithms may require observations, such as the flow samples, that may be vectors of numerical values. As such, the flow sample 210 may include flow header values that are numerical values such as a source address value 211, a destination address value 212, and a destination port value 213. The destination port numbers in flow logs may be expressed as integers (e.g., a 16 bit integer for IPV4 and IPV6 flow log entries). The IP addresses may be converted into flow header values by concatenating the octets to form an integer that is a numerical value. For example, the four octet IP address "0f:ec:45:02" may become the 32 bit address value 0x0fec4502 where "0x" indicates that the integer is written in base 16. The 16 bit destination port number may be converted to a 32 bit integer to simplify the clustering process such as when the other flow header values in the flow sample are 32 bit integers. For example, the 16 bit port number 0xb345 may become the 32 bit port value 0x0000b345. As such, a 4 byte source IP address 202 may become a 32 bit source address value 211, a 4 byte destination IP address 203 may become a 32 bit destination address value 212, and a 16 bit destination port 205 may become a 32 bit destination port value 213. Other examples may use different data types for representing the source address value 211, destination address value 212, and destination port value 213. For example, IPv6 has 128 bit addresses. As such, an example using IPV6 may have a source address value 211 and a destination address value 212 that are 128 bit integers. A flow sample 210 containing three flow header values may be called a 3-tuple and may be interpreted as a vector or a point in a 3-dimensional space.

Figure 3:
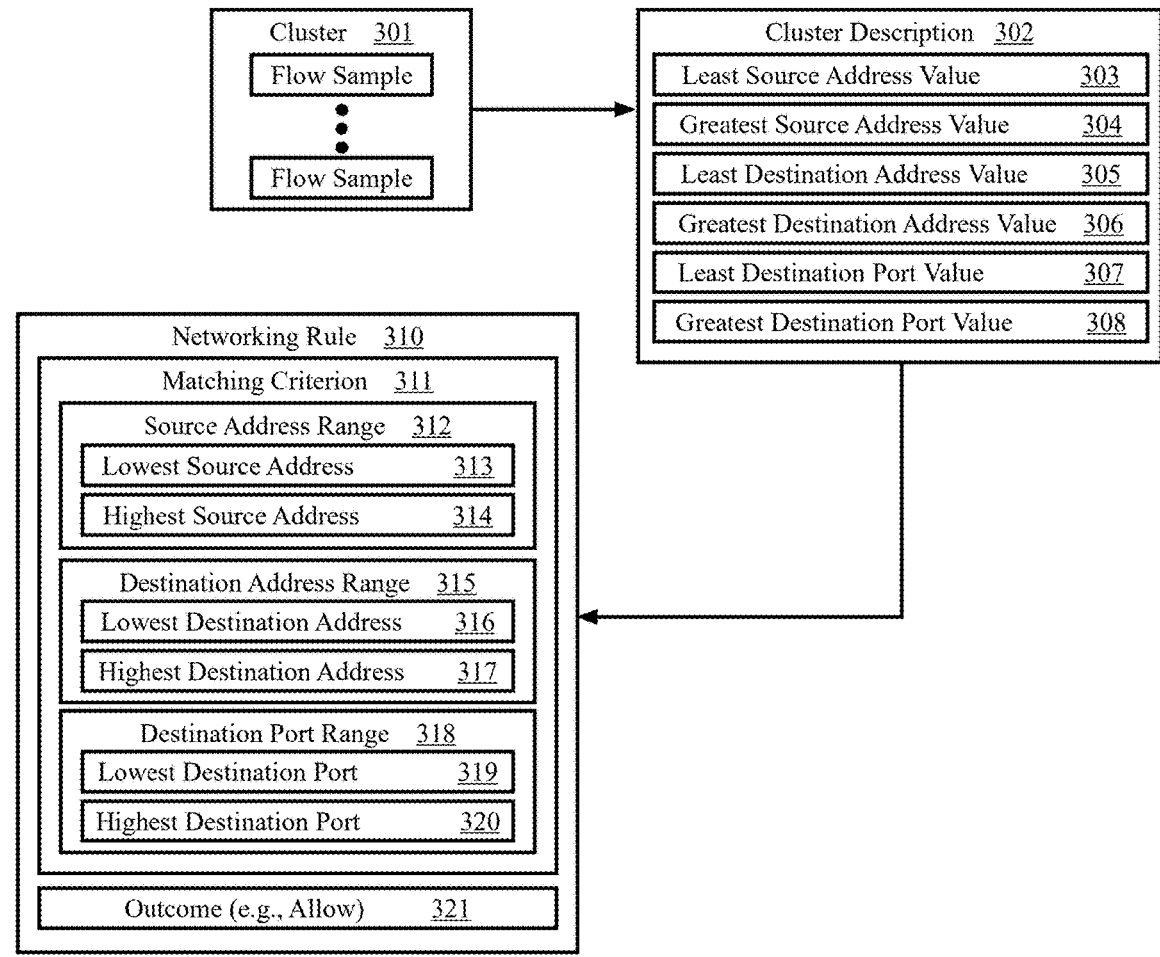
FIG. 3 is a high-level block diagram illustrating an example of a networking rule such as a firewall rule that is created from a cluster, according to some aspects.

FIG. 3 is a high-level block diagram illustrating an example of a networking rule such as a firewall rule that may be created from a cluster, according to some aspects. The clustering algorithm may identify clusters of flow samples. Each of the flow samples may be in one of the clusters. The flow samples in a cluster 301 may therefore be used to produce a cluster description 302. The cluster description may include a least source address value 303, a greatest source address value 304, a least destination address value 305, a greatest destination address value 306, a least destination port value 307, and a greatest destination port value 308. The least source address value 303 may be the lowest source address value in all the flow samples in the cluster. The greatest source address value 304 may be the highest source address value in all the flow samples in the cluster. The least destination address value 305 may be the lowest destination address value in all the flow samples in the cluster. The greatest destination address value 306 may be the highest destination address value in all the flow samples in the cluster. The least destination port value 307 may be the lowest destination port value in all the flow samples in the cluster. The greatest destination port value 308 may be the highest destination port value in all the flow samples in the cluster. A network rule may be produced from the cluster description because the least and greatest values indicate parameter ranges that may be included in the networking rule's matching criterion 311.

In an example, the networking rule producer 118 may produce the matching criterion 311 of a network rule by converting the values in the cluster description 302 into the IP addresses and port numbers in the matching criterion. For example, the 32 bit address value 0x0fec4502 in a cluster description may be converted to the four octet IP address "0f:ec:45:02" and stored in one of the address fields in the matching criterion. Furthering the example, the 32 bit port value 0x0000b345 in a cluster description may be converted to the 16 bit port number 0xb345 and stored in one of the port number fields in the matching criterion. The lowest source address 313 in the source address range 312 of the matching criterion 311 may be set from the least source address value 303 in the cluster description 302. The highest source address 314 in the source address range 312 of the matching criterion 311 may be set from the greatest source address value 304 in the cluster description 302. The lowest destination address 316 in the destination address range 315 of the matching criterion 311 may be set from the least destination address value 305 in the cluster description 302. The highest destination address 317 in the destination address range 315 of the matching criterion 311 may be set from the greatest destination address value 306 in the cluster description 302. The lowest destination port 319 in the destination port range 318 of the matching criterion 311 may be set from the least destination port value 307 in the cluster description 302. The highest destination port 320 in the destination port range 318 of the matching criterion 311 may be set from the greatest destination port value 308 in the cluster description 302. All the flow samples in the training set may have the same outcome (e.g., Allow) and all the flow samples in a cluster may have the same outcome. As such, the outcome 321 of the networking rule 310 may be the outcome of all the flow samples in the cluster. In an example where the training set has flow samples with different outcomes, the cluster description may include the outcome of all the flows in the cluster.

Networking devices may require ranges of IP addresses to be in Classless Inter-Domain Routing (CIDR) format. CIDR is well known in computer networking and related fields. CIDR may specify a range of addresses by specifying an IP address and a subnet mask. The subnet mask may indicate which bits of the IP address define the range. For example, the CIDR formatted IPv4 range 1.1.1.0/24 includes all the IP addresses whose first 24 bits are the same as the first 24 bit of the IP address 1.1.1.0. The lowest IP address in the range is 1.1.1.0 and the highest IP address in the range is 1.1.1.255. The IP addresses in a matching criterion may be adjusted such that each range may be expressed in CIDR format. Alternatively, one of the common and well-known "range to CIDR" algorithms may be used to express an IP address range as a set of CIDR formatted address ranges. In one example, the address ranges of a networking rule's matching criterion may include numerous CIDR formatted ranges. In another example, a set of networking rules may be produced where each source address range and each destination address range may be expressed as a single CIDR formatted range such that the set of networking rules covers an identified cluster.

Figure 4:
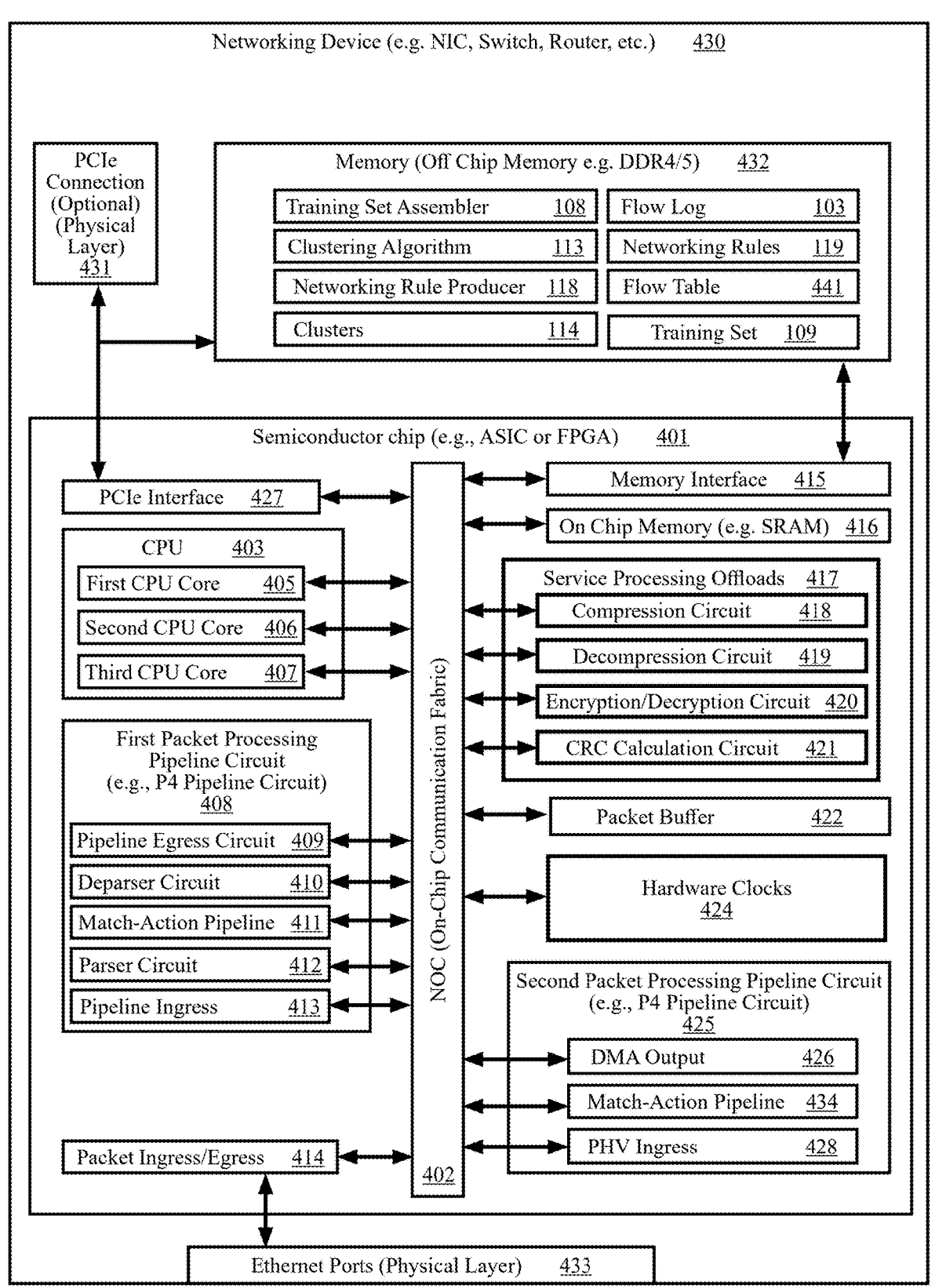
FIG. 4 is a functional block diagram illustrating an example of a networking device automated production of networking rules, according to some aspects.

FIG. 4 is a functional block diagram illustrating an example of a networking device 430 having a semiconductor chip 401 such as an application specific integrated circuit (ASIC) or field programmable gate array (FPGA), according to some aspects. The networking device may implement a control plane implemented by one or more processors (e.g., CPU 403) and a data plane that may be implemented by a packet processing pipeline circuit (e.g., packet processing pipeline circuit 408). In some examples, the data plane may create the training set and the control plane may use the training set to produce network rules. The semiconductor chip 401 shows a single semiconductor chip implementing a large number of hardware functions. An implementation may employ a chiplet architecture. A chiplet may be an active silicon die containing computational logic to perform all or part of a task. The task may be performed by a single active silicon die or by multiple active silicon dies operating together. The chiplets may be packaged together as a monolithic unit on the same substrate. A device having a chiplet architecture may have a programming model that conceptually treats numerous chiplets as a monolithic unit such that the individual chiplets are not exposed as distinct units to an application running on or using the device. If the networking device is a network interface card (NIC) then the NIC may be installed in a host computer and may act as a networking device for the host computer and for virtual machines running on the host computer. Such a NIC may have a peripheral component interconnect express (PCIe) connection 431 for communicating with the host computer via a host PCIe connection. The networking device 430 may have a semiconductor chip 401, off-chip memory 432, and ethernet ports 433. The off-chip memory 432 may be one of the widely available memory modules or chips such as double data rate 5 (DDR5) synchronous dynamic random-access memory (SDRAM) such that the semiconductor chip 401 has access to many gigabytes of memory on the networking device 430. The ethernet ports 433 provide physical connectivity to a computer network such as the internet. The NIC may include a printed circuit board to which the semiconductor chip 401 and the memory 432 are attached.

The semiconductor chip may have many core circuits interconnected by an on-chip communications fabric, sometimes called a network on a chip (NOC) 402. NOCs may be implementations of standardized communications fabrics such as the widely used advanced extensible interface (AXI) bus. The semiconductor chip's core circuits may include a PCIe interface 427, CPU 403, first packet processing pipeline circuit 408, packet ingress/egress circuits 414, memory interface circuit 415, on-chip memory 416 that may be a static random access memory (SRAM), service processing offloads 417, a packet buffer 422, hardware clocks 424, and a second packet processing pipeline circuit 425. The service processing offloads may include a compression circuit 418, a decompression circuit 419, an encryption/decryption circuit 420, and a cyclic redundancy check (CRC) calculation circuit 421. The PCIe interface 427 may be used to communicate with a host computer via the PCIe connection 431. The CPU 403 may include numerous CPU cores such as a first CPU core 405, a second CPU core 406, and a third CPU core 407. The CPU 403 may implement the control plane of the networking device 430. The first packet processing pipeline circuit 408 may include a pipeline ingress circuit 413, a parser circuit 412, a match-action pipeline 411, a deparser circuit 410, and a pipeline egress circuit 409. The second packet processing pipeline circuit 425 may include a packet header vector (PHV) ingress circuit 428, a match-action pipeline 434, and a direct memory access (DMA) output circuit 426. The specific core circuits implemented within the non-limiting example of the semiconductor chip 401 may be selected such that the semiconductor chip implements many, perhaps all, of the functionality of an InfiniBand channel adapter, of a nonvolatile memory express (NVMe) card, and of a networking device that processes network flows carried by internet protocol (IP) packets.

A networking device may include precision clocks that output a precise time, clocks that are synchronized to remote authoritative clocks via precision time protocol (PTP), and hardware clocks 424. A hardware clock may provide a time value (e.g., year/day/hour/minute/second/ . . . ) or may simply be a counter that may be incremented by one at regular intervals (e.g., once per clock cycle for a device having a 10 nsec. clock period). Time values obtained from the clocks may be used as timestamps for events such as enqueuing/dequeuing a packet.

The first packet processing pipeline circuit 408 may be a specialized set of elements for processing PHVs including PHVs for network packets such as internet protocol (IP) packets and InfiniBand protocol data units (PDUs). The data plane may be implemented by a packet processing pipeline circuit such as the first packet processing pipeline circuit 408. A packet processing pipeline circuit such as the first packet processing pipeline circuit 408 may be a "P4" packet processing pipeline. The concept of a domain-specific language for programming protocol-independent packet processors, known simply as "P4," developed to provide some flexibility at the data plane of a networking device. The P4 domain-specific language for programming the data plane of networking devices has been defined in the "P416 Language Specification," published by the P4 Language Consortium. P4 (also referred to as the "P4 specification," the "P4 language," and the "P4 program") may be implemented on a large variety of targets including switches, routers, programmable NICs, software switches, field programmable gate arrays (FPGAs), and application specific integrated circuits (ASICs).

The second packet processing pipeline circuit 425 may be a specialized set of elements for processing PHVs including PHVs for network packets such as internet protocol (IP) packets and InfiniBand protocol data units (PDUs). The second packet processing pipeline circuit 425 may be a P4 packet processing pipeline circuit that implements a P4 pipeline that may be configured using a domain-specific language such as the P4 domain specific language. As described in the P4 specification, the primary abstractions provided by the P4 language relate to header types, parsers, tables, actions, match-action units, control flow, extern objects, user-defined metadata, and intrinsic metadata. The data plane may be implemented by the first packet processing pipeline circuit 408 in combination with the second packet processing pipeline circuit 425.

The networking device 430 may include a memory 432 for running Linux or some other operating system and for storing data used by the processes implementing network services, upgrading the control plane, upgrading the data plane, etc. The networking device may use the memory 432 to store a flow table 441, a flow log 103, clusters 114, a training set 109, and networking rules 119. The memory 432 may also store executable code and data that may be executed by the control plane or the data plane to implement a training set assembler 108, a clustering algorithm 113, and a networking rule producer 118. The flow table 441 may include code and instructions that the data plane uses for processing network packets. The data plane may store a flow log entry in the flow table 441 for each packet that may be processed or for a subset of the packets that may be processed. In some examples, the data plane may store a flow sample in the training set 109 while processing some of the packets. For example, a flow sample may be stored for every packet or for every flow that may be allowed through a firewall implemented by the data plane. In another example, the training set 109 may be created by the training set assembler 108 when it analyzes the flow log. The clustering algorithm 113 may identify the clusters 114 of flow samples in the training set 109. The networking rule producer 118 may produce networking rules 119 from the clusters identified by the clustering algorithm 113.

The CPU cores 405, 406, 407 may be general purpose processor cores, such as reduced instruction set (RISC) processor cores, advanced RISC machine (ARM) processor cores, and/or x86 processor cores, as is known in the field. Each CPU core may include an arithmetic logic unit (ALU), a register bank, an instruction fetch unit, and an instruction decoder, that may be configured to execute instructions independently of the other CPU cores. The CPU cores may be programmable using a general-purpose programming language such as C.

The CPU 403 may also include a bus interface, internal memory, and a memory management unit (MMU) and/or memory protection unit. For example, the CPU cores may include internal cache, e.g., level 1 cache and/or level 2 cache, and/or may have access to nearby level 2 and/or level 3 cache. Each CPU core may include core-specific level 1 cache, including instruction-cache and data-cache and level 2 cache that may be specific to each CPU core or shared amongst a small number of CPU cores. Level 3 cache may also be available to the CPU cores.

There may be multiple CPU cores 405, 406, 407 available for control plane functions and for implementing aspects of a slow data path that includes software implemented packet processing functions. The CPU cores may be used to implement discrete packet processing operations such as layer 7 applications (e.g., layer 7 load balancing, layer 7 firewalling, and/or layer 7 telemetry), certain InfiniBand channel adapter functions, flow table insertion or table management events, connection setup/management, multicast group join, deep packet inspection, storage volume management (e.g., NVMe volume setup and/or management), encryption, decryption, compression, and decompression, which may not be readily implementable through a domain-specific language such as P4, in a manner that provides fast path performance as may be expected of data plane processing.

The packet buffer 422 may act as a central on-chip packet switch that delivers packets from the network interfaces 433 to packet processing elements of the data plane and vice-versa. The packet processing elements may include a slow data path implemented in software and a fast data path (the data plane) implemented by one or more packet processing pipeline circuits 408, 425. Packet processing pipeline circuits 408, 425 may be specialized circuits or parts of a specialized circuit implemented in one or more semiconductor chips (e.g., ASICs, FPGAs, etc.). Some networking devices may include semiconductor chips or chiplets implementing a P4 pipeline of a data plane within the networking device.

All data transactions in the semiconductor chip 401, including on-chip memory transactions, and register reads/writes may be performed via a coherent interconnect 402. In one non-limiting example, the coherent interconnect may be provided by a network on a chip (NOC) "IP core". Semiconductor chip designers may license and use prequalified IP cores within their designs. Prequalified IP cores may be available from third parties for inclusion in chips produced using certain semiconductor fabrication processes. Numerous vendors provide NOC IP cores. The NOC may provide cache coherent interconnect between the NOC masters, including the first packet processing pipeline circuit 408, the second packet processing pipeline circuit 425, CPU 403, memory interface circuit 415, and PCIe interface 427. The interconnect may distribute memory transactions across a plurality of memory interfaces using a programmable hash algorithm. All traffic targeting the memory may be stored in a NOC cache (e.g., 1 megabyte cache). The NOC cache may be kept coherent with the CPU core caches.

Figure 5:
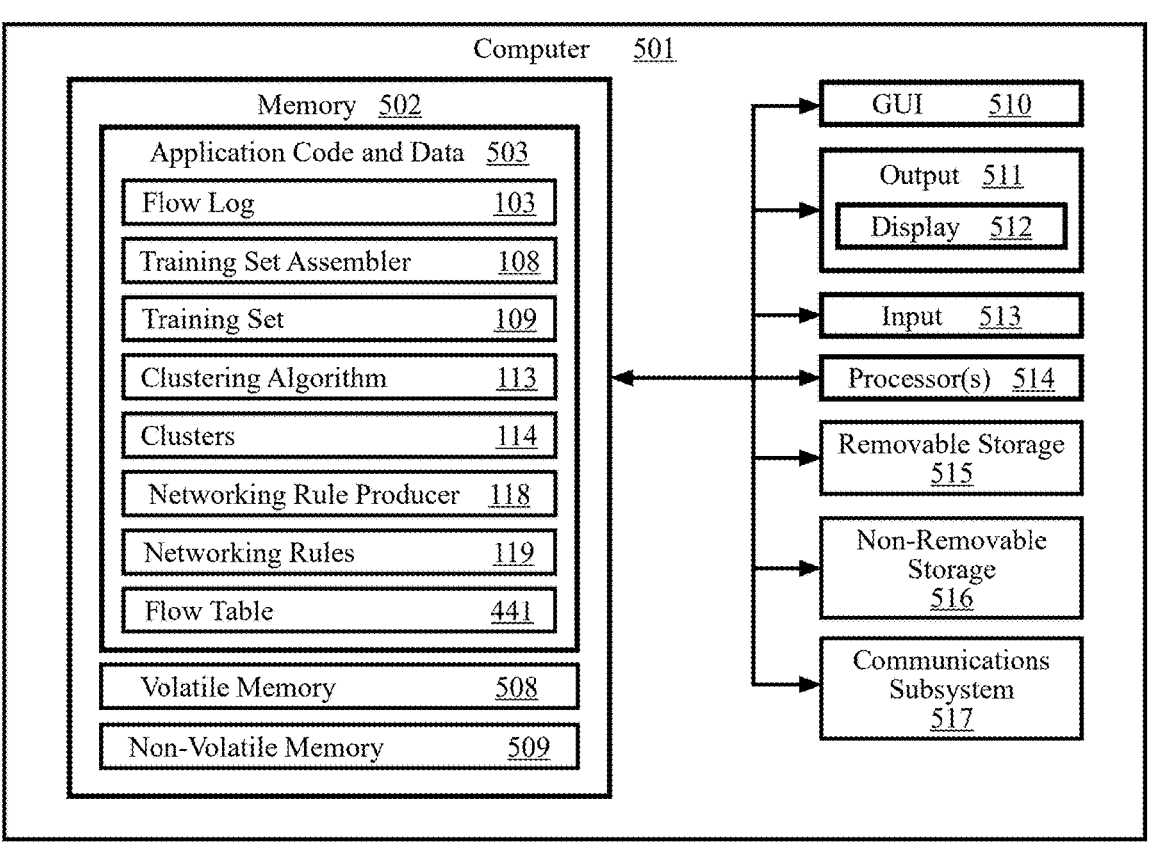
FIG. 5 is a high level block diagram illustrating an example of a computer configured to implement automated production of networking rules, according to some aspects.

FIG. 5 is a high level block diagram illustrating an example of a computer 501 configured to implement automated production of networking rules, according to some aspects. The computer 501 may be one of the computers in a data center. In an example, a data center includes racks of rack mounted servers and the computer 501 is one of those rack mounted servers. The computer 501 may be configured to interface with controllers, peripheral devices, and other elements may include one or more processors 514, memory 502, removable storage 515, and non-removable storage 516. The one or more processors may be RISC or complex instruction set (CISC) processors that are communicatively coupled to the memory 502 and other hardware elements of the computer 501. Memory 502 may include volatile memory 508 and non-volatile memory 509. The computer 501 may include or have access to a computing environment that includes a variety of transitory and non-transitory computer-readable media such as volatile memory 508 and non-volatile memory 509, removable storage 515 and non-removable storage 516. Computer storage may be computer readable medium such as random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data including image data.

The computer 501 may include, or have access to, a computing environment that includes input 513, output 511, and a communications subsystem 517. The computer may include a networking device 430 as or within the communications subsystem 517. In an example, the networking device 430 is a network interface card (NIC) that performs the functions of the communications subsystem 517. In an example, the computer may operate in a data center and may use the communications subsystem 517 to communicate with other computers and with networking devices that are also in the data center. In an example, the computer 501 may operate in a networked environment using the communications subsystem 517 to connect to one or more remote computers, remote sensors and/or controllers, detection devices, hand-held devices, multi-function devices, speakers, mobile devices, tablet devices, mobile phones, Smartphone, or other such devices. The remote computer may also be a personal computer (PC), server, router, network PC, a peer device or other common network node, etc. The communication connection may include a local area network (LAN), a wide area network (WAN), Bluetooth connection, or other networks.

Output 511 may be provided as a computer monitor or display 512, but may be or include any output device. Output 511 and/or input 513 may include a data collection apparatus associated with the computer 501. In addition, input 513, which commonly includes a computer keyboard and/or pointing device such as a computer mouse, computer trackpad, touch screen, or the like, allows a user to select and instruct the computer 501. A user interface may be provided using output 511 and input 513. Output 511 may include a display 512 for displaying data and information for a user, or for interactively displaying a graphical user interface (GUI) 510. A GUI may be responsive to user inputs entered through input 513 and typically displays images and data on display 512. Note that the term "GUI" generally refers to a type of environment that represents programs, files, options, and so forth by means of graphically displayed icons, menus, and dialog boxes on a computer monitor screen or smart phone screen. A user may interact with the GUI to select and activate such options by directly touching the screen and/or pointing and clicking with a user input device 513 such as, for example, a pointing device such as a mouse, and/or with a keyboard. A particular item may function in the same manner to the user in all applications because the GUI provides standard software routines to handle these elements and report the user's actions.

Computer-readable instructions, also called computer code or application code, may include or be representative of software routines, software subroutines, software objects, etc. Application data may be data used by or produced by the execution of computer readable instructions. Application code and data 503 may be stored on a computer-readable medium for use by or for execution by the processor 514 of the computer 501. The application code and data 503 may include a flow table 441, a flow log 103, clusters 114 of flow samples, a training set 109, networking rules 119, a training set assembler 108, a clustering algorithm 113, and a networking rule producer 118. The flow log may be obtained from a networking device or other device that produces or stores flow logs. In the example illustrated in FIG. 5, the computer 501 may produce the training set, identify the clusters, and produce the networking rules.

Figure 6:
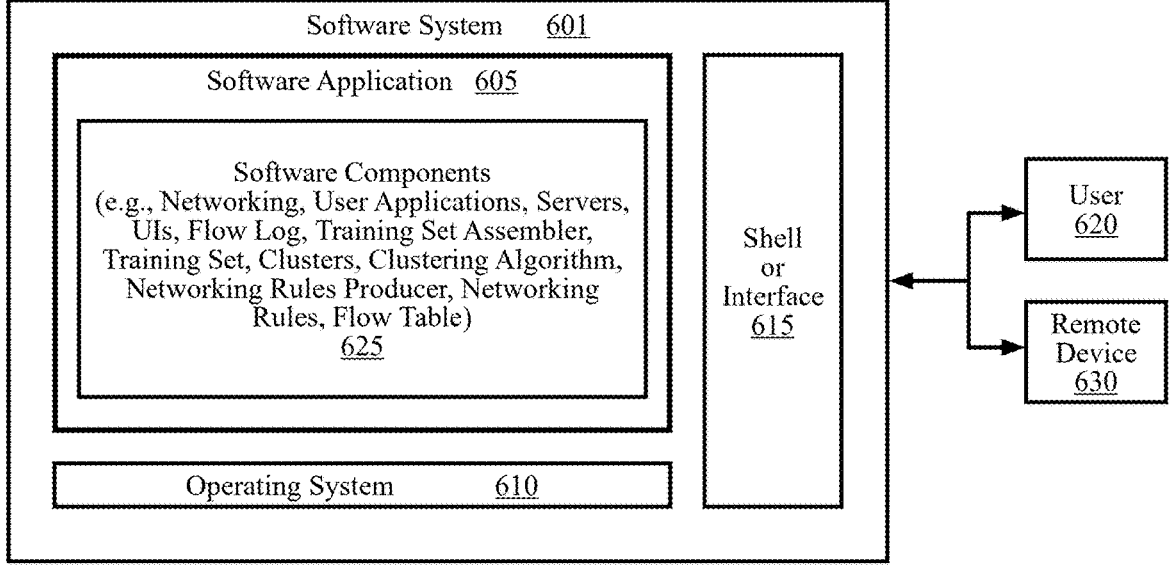
FIG. 6 is a high level block diagram illustrating an example of a software system that may be configured to implement automated production of networking rules, according to some aspects.

FIG. 6 is a high level block diagram illustrating an example of a software system 601 that may be configured to implement automated production of networking rules, according to some aspects. Software components 625, may be stored in memory 502, on removable storage 515, or on non-removable storage 516, and generally includes and/or may be associated with a kernel or operating system 610 and a shell or interface 615. One or more application programs may be "loaded" (i.e., transferred from removable storage 515 or non-removable storage 516 into the memory 502) for execution by the computer 501. A software application 605 may include software components 625 and data such as software modules, software subroutines, software objects, networking code, user application code, server code, user interface code, a flow table 441, a flow log 103, clusters 114 of flow samples, a training set 109, networking rules 119, a training set assembler 108, a clustering algorithm 113, and a networking rule producer 118. The computer 501 may receive user commands and data through interface 615, which may include input 513, output 511, and communications connection 517 accessible by a user 620 or remote device 630. These inputs may then be acted upon by the computer 501 in accordance with instructions from operating system 610 and/or software application 605 and any software components 625 thereof.

Generally, software components 625 may include, but are not limited to, routines, subroutines, software applications, programs, objects, modules, objects (used in object-oriented programs), executable instructions, data structures, etc., that perform specific tasks or implement specific abstract data types and instructions. Moreover, those skilled in the art will appreciate that elements of the disclosed methods and systems may be practiced with other computer system configurations such as, for example, hand-held devices, mobile phones, smartphones, tablet devices, multi-processor systems, microcontrollers, printers, copiers, fax machines, multi-function devices, data networks, microprocessor-based or programmable consumer electronics, networked personal computers, minicomputers, mainframe computers, servers, medical equipment, medical devices, etc.

Note that the terms "component" and "module" as utilized herein may refer to one of or a collection of routines and data structures that perform a particular task or implement a particular abstract data type. Applications and components may be composed of two parts: an interface, which lists the constants, data types, variables, and routines that may be accessed by other modules or routines; and an implementation, which may be private (accessible only from within the application or component) and which may include source code that implements the routines in the application or component. The terms application or component may also simply refer to an application such as a computer program designed to assist in the performance of a specific task such as word processing, accounting, inventory management. Components may be built or realized as special purpose hardware components designed to equivalently assist in the performance of a task.

The interface 615 may include a graphical user interface 510 that may display results, whereupon a user 620 or remote device 630 may supply additional inputs or terminate a particular session. In some examples, operating system 610 and GUI 510 may be implemented in the context of a "windows" system. It may be appreciated, of course, that other types of systems are possible. For example, rather than a traditional windows system, other operating systems such as, for example, a real-time operating system employed in wireless systems may also be employed with respect to operating system 610 and interface 615. The software application 605 may include software components 625 that may include instructions for carrying out steps or logical operations such as those shown and described herein.

The description herein is presented with respect to examples that may be implemented by or require the use of, a data-processing system such as computer 501, in conjunction with program code in an application code and data 503 in memory 502, or software system 601. The disclosed examples, however, are not limited to any specific application or environment. Instead, those skilled in the art will find that the systems and methods disclosed herein may be advantageously applied to a variety of system and application software including database management systems, word processors, etc. Moreover, the systems and methods may be implemented using a variety of different platforms including Windows, Macintosh, Linux, Android, Arduino, etc. Therefore, the descriptions of the examples that follow are for purposes of illustration and not considered limitations.

FIG. 7 is a high-level flow diagram illustrating an example of a process 700 for identifying clusters from a training set produced from a flow log, according to some aspects. The example illustrated in FIG. 7 may be implemented by a control plane or by a general purpose computer as a training set producer. Furthermore, the example may be used for producing a set of firewall rules wherein the training set producer selects for "allow" outcomes. Other types of networking rules may be produced when the training set producer selects for other outcomes. After the start, the training set may be initialized at block 701. For example, a data structure for holding the flow samples may be instantiated at block 701. At block 702, a "current entry" variable may be set to the first flow log entry in a flow log. The process may move to block 706 if the outcome indicated by the current entry is "allow" at decision block 703. Otherwise, the process may move to decision block 704. At block 706, the source IP address in the current entry may be converted to a source address value. An IP address may be expressed as a series of octets or bytes that may be interpreted as, cast to, or converted to an integer (e.g., the four octet IP address "0f:ec:45:02" may become the 32 bit address value 0x0fec4502 where "0x" indicates that the integer is written in base 16). At block 707, the destination IP address in the current entry may be converted to a destination address value. At block 708, the destination port number in the current entry may be converted to a destination port value (e.g., the 16 bit port number 0xb345 may become the 32 bit port value 0x0000b345). At block 709, a flow sample that includes the source address value, the destination address value, and the destination port value may be created. At block 710, the flow sample may be added to the training set before the process moves to decision block 704. The process may move to block 711 if the current entry is the last flow log entry in the flow log at decision block 704. Otherwise, the process may move to block 705. At block 705, the current entry variable may be set to the next flow log entry in the flow log. At block 711, assembling the training set may be complete and the training set may be submitted to a clustering algorithm.

Figure 8:
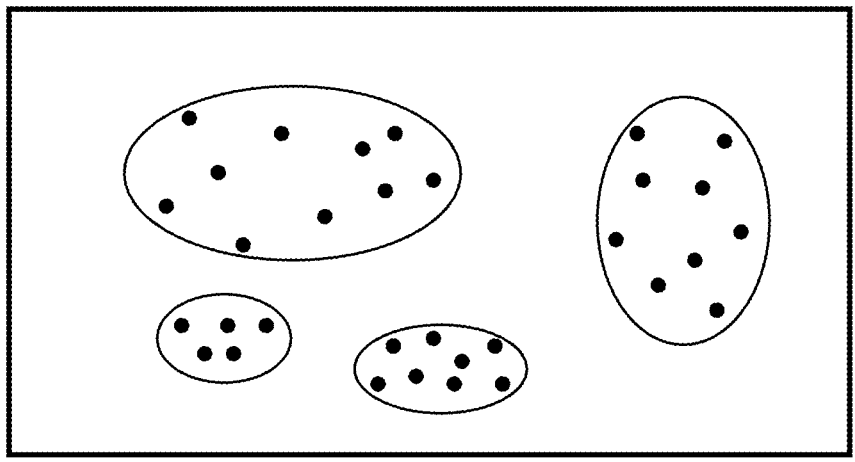
FIG. 8 is an illustration of an example of clusters identified by a K-means algorithm or a nearest-neighbor algorithm such as a K-means algorithm, according to some aspects.
Figure 9:
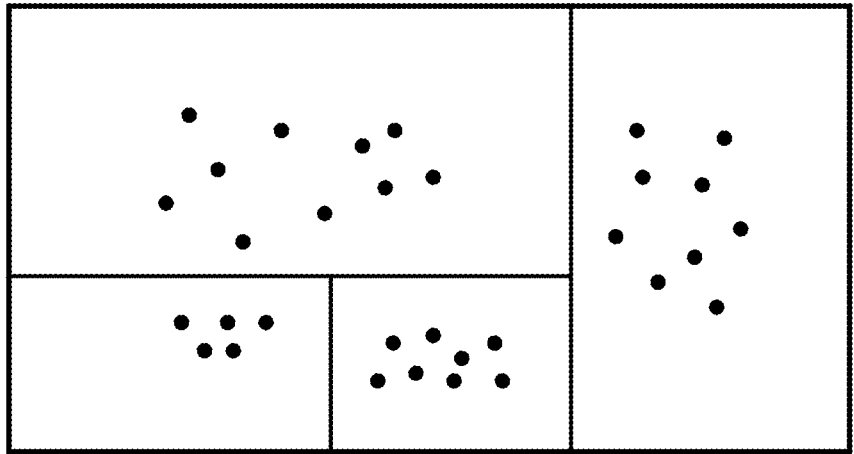
FIG. 9 is an illustration of an example of clusters identified by a random cut forest algorithm, according to some aspects.

FIG. 8 is an illustration of an example of clusters identified by a K-means algorithm or a nearest-neighbor algorithm such as a K nearest-neighbor algorithm, according to some aspects. The K-means algorithm and nearest-neighbor algorithms (e.g., the K nearest-neighbor algorithm) are well known unsupervised learning algorithms in the art of machine learning. The literature and the freely available code repositories (e.g., github) have numerous examples of such algorithms that may be easily adapted to identify clusters of flow samples in the training set described herein. FIG. 9 is an illustration of an example of clusters identified by a random cut forest algorithm, according to some aspects. Random cut forest algorithms are well known unsupervised learning algorithms in the art of machine learning. The literature and the freely available code repositories (e.g., github) have numerous examples of such algorithms that may be easily adapted to identify clusters of flow samples in the training set described herein. The output of the clustering algorithms may be clusters of the flow samples or cluster specifications that may be used to assign the flow samples to a cluster.

Figure 10:
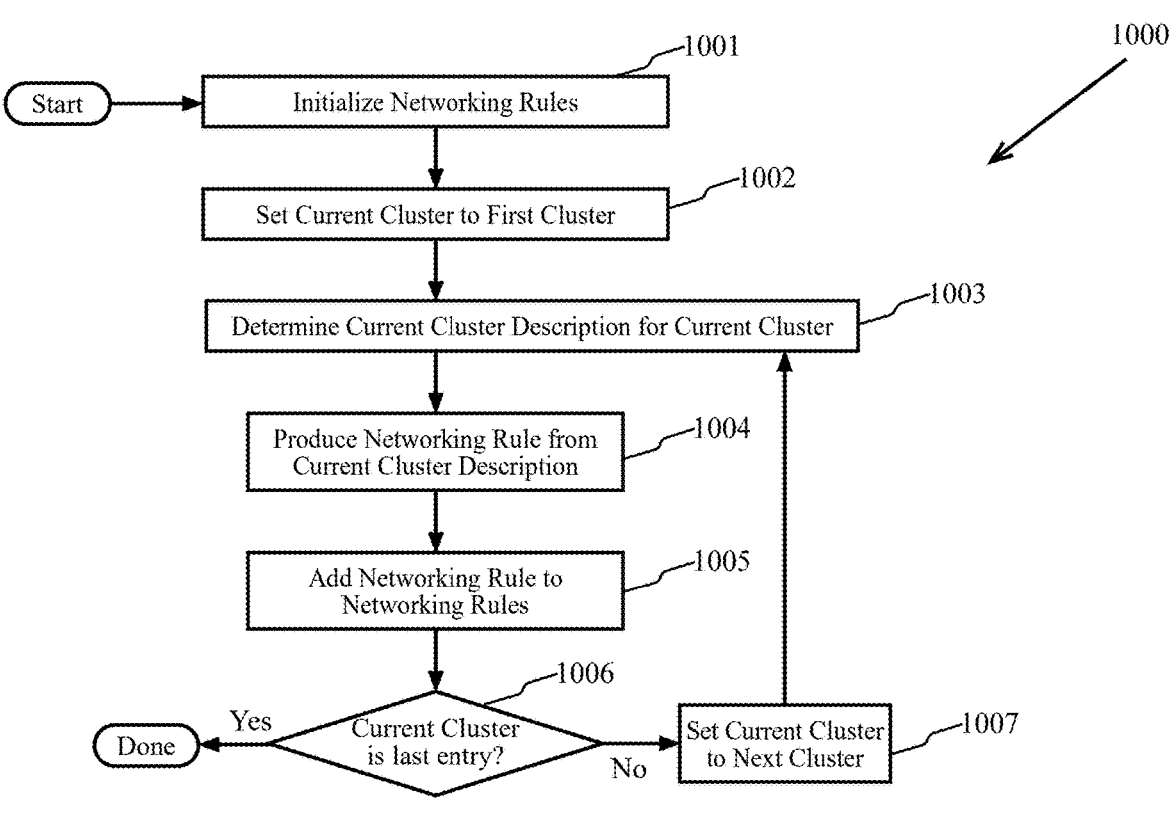
FIG. 10 is a high-level flow diagram illustrating an example of a process for producing networking rules from clusters, according to some aspects.

FIG. 10 is a high-level flow diagram illustrating an example of a process 1000 for producing networking rules from clusters, according to some aspects. At block 1001, the network rules may be initialized by, for example, creating an empty list to which networking rules may be added. At block 1002, the current cluster variable may be set to the first cluster in the set of clusters identified by the clustering algorithm. At block 1003, the current cluster description that describes the current cluster may be determined. At block 1004, a networking rule may be produced from the current cluster description. At block 1005, the networking rule may be added to the networking rules. The process may be done if the current cluster is the last cluster at decision block 1006, otherwise the process may move to block 1007. At block 1007, the current cluster variable may be set to the next cluster identified by the clustering algorithm before the process loops back to block 1003.

Figure 11:
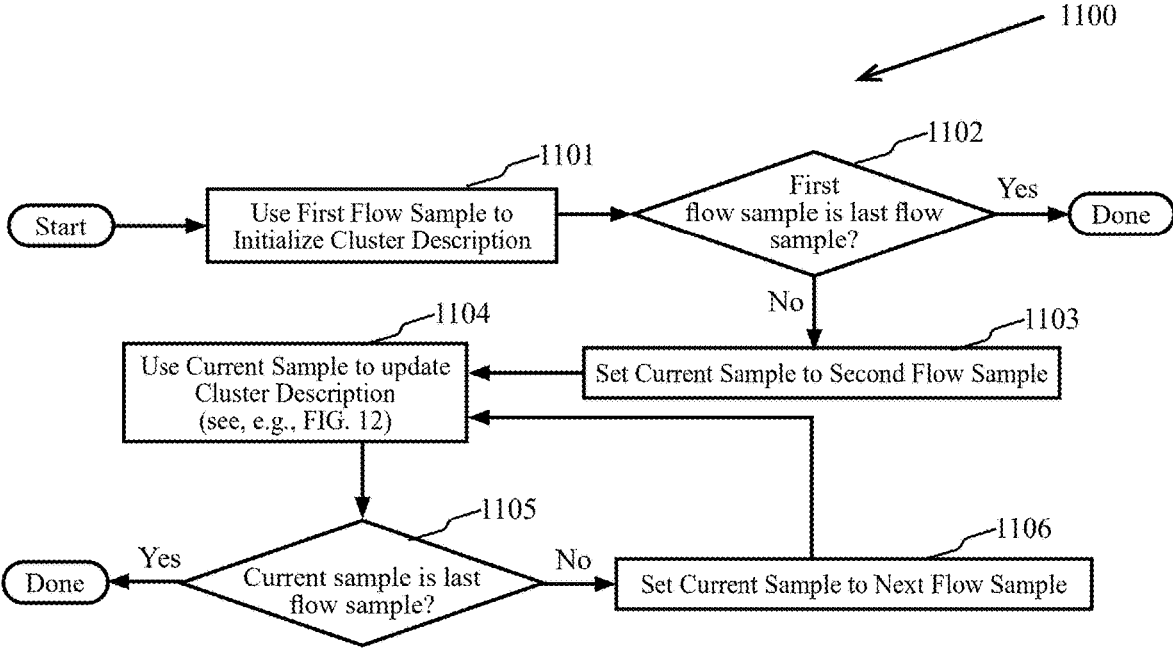
FIG. 11 is a high-level flow diagram illustrating an example of a process for producing a cluster description from a cluster, according to some aspects.

FIG. 11 is a high-level flow diagram illustrating an example of a process 1100 for producing a cluster description from a cluster, according to some aspects. After the start, the first flow sample in the cluster may be used to initialize the cluster description at block 1101. In one example, the cluster description may be initialized by: setting the least source address value 303 and the greatest source address value 304 to equal the source address value 211 in the first flow sample; setting the least destination address value 305 and the greatest destination address value 306 to equal the destination address value 212 in the first flow sample; and setting the least destination port value 307 and the greatest destination port value 308 to equal the destination port value 213 in the first flow sample. The process may be done if the first sample is the last flow sample in the cluster at decision block 1102, otherwise the process may move to block 1103. At block 1103, a current sample variable may be set to the second flow sample in the cluster. At block 1104, the current sample may be used to update the cluster description. The process may be done if the current sample is the last flow sample in the cluster at decision block 1105, otherwise the process may move to block 1106. At block 1106, the current sample variable may be set to the next flow sample in the cluster before the process loops back to block 1104.

Figure 12:
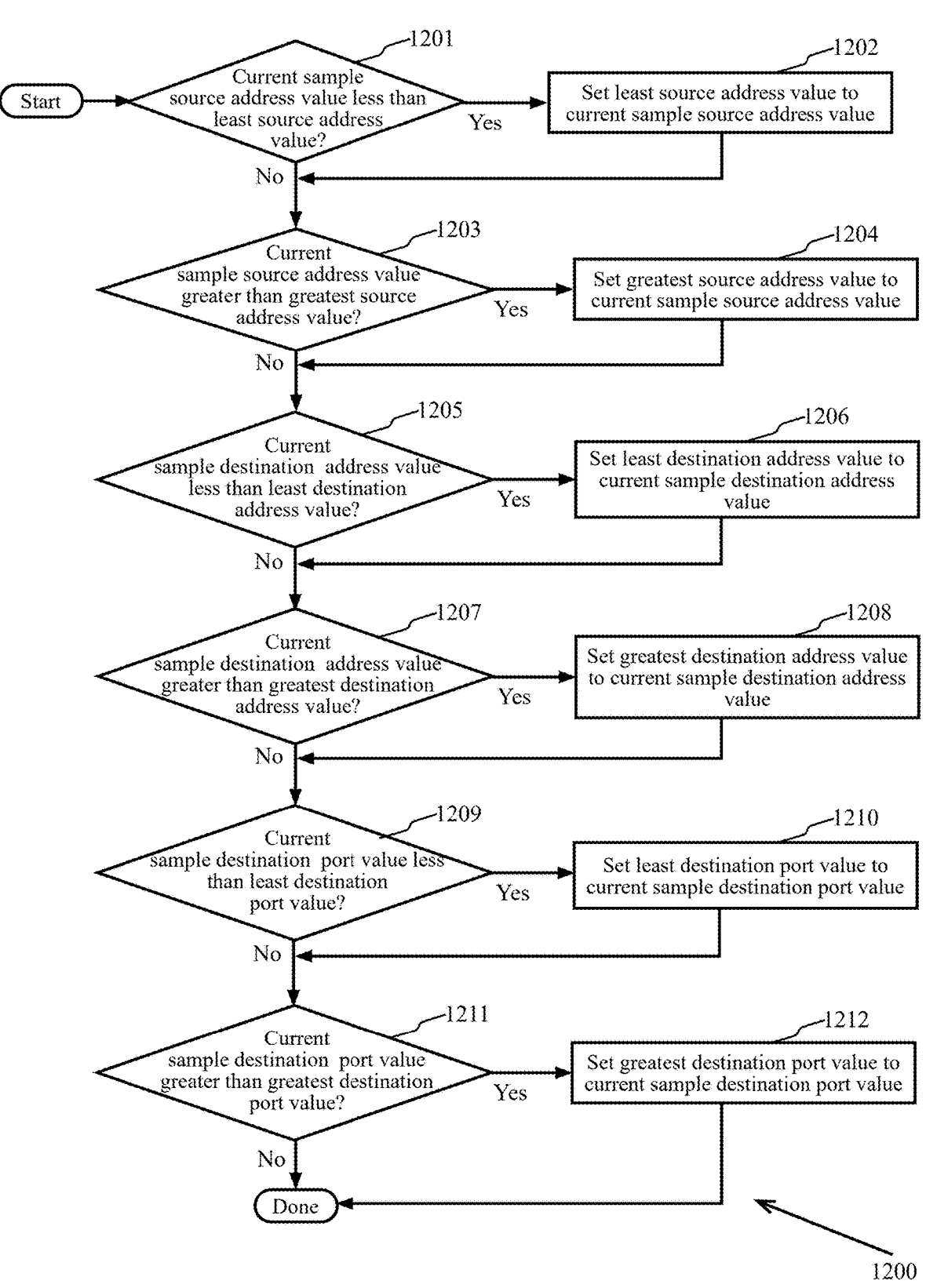
FIG. 12 is a high-level flow diagram illustrating an example of a process for using a flow sample to update a cluster description, according to some aspects.

FIG. 12 is a high-level flow diagram illustrating an example of a process 1200 for using a flow sample to update a cluster description, according to some aspects. After the start, the process may move to decision block 1201. The process may move to block 1202 if the source address value in the current sample is less than the least source address value of the cluster description at decision block 1201 and otherwise may move to decision block 1203. At block 1202, the least source address value of the cluster description may be set to the source address value in the current sample. The process may move to block 1204 if the source address value in the current sample is greater than the greatest source address value of the cluster description at decision block 1203 and otherwise may move to decision block 1205. At block 1204, the greatest source address value of the cluster description may be set to the source address value in the current sample. The process may move to block 1206 if the destination address value in the current sample is less than the least destination address value of the cluster description at decision block 1205 and otherwise may move to decision block 1207. At block 1206, the least destination address value of the cluster description may be set to the destination address value in the current sample. The process may move to block 1208 if the destination address value in the current sample is greater than the greatest destination address value of the cluster description at decision block 1207 and otherwise may move to decision block 1209. At block 1208, the greatest destination address value of the cluster description may be set to the destination address value in the current sample. The process may move to block 1210 if the destination port value in the current sample is less than the least destination port value of the cluster description at decision block 1209 and otherwise may move to decision block 1211. At block 1210, the least destination port value of the cluster description may be set to the destination port value in the current sample. The process may move to block 1212 if the destination port value in the current sample is greater than the greatest destination port value of the cluster description at decision block 1211 and otherwise the process may be done. At block 1212, the greatest destination port value of the cluster description may be set to the destination port value in the current sample.

Figure 13:
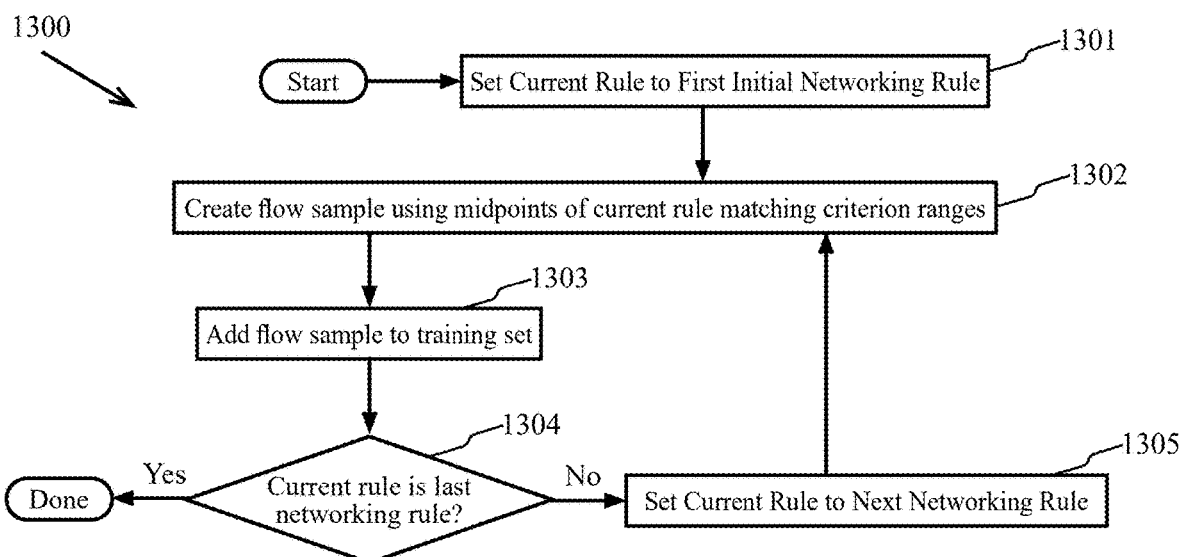
FIG. 13 is a high-level flow diagram illustrating an example of a process for producing flow samples from initial networking rules, according to some aspects.

Flow samples may be created from a set of initial networking rules instead of, or in addition to, creating the flow samples from a flow log. FIG. 13 is a high-level flow diagram illustrating an example of a process 1300 for producing flow samples from initial networking rules, according to some aspects. At block 1301, the current rule variable may be set to the first initial networking rule in an initial networking rule set 107. At block 1302, a flow sample may be created using the midpoints of the current rule matching criterion ranges. For example, the matching criterion of the current rule may have a source address range 312 that includes a lowest source address 313 and a highest source address 314. Lowest source address may be converted to a first value, the second address may be converted to a second value, and the midpoint may be one half of the sum of the first value and the second value. That midpoint may be the source address value 211 of the flow sample. The destination address value 212 and the destination port value 213 may be similarly determined from destination address range 315 and the destination port range 318 in the matching criterion of the current rule. At block 1303, the flow sample may be added to the training set. The process may be done if the current rule is the last networking rule in the initial networking rule set at decision block 1304, otherwise the process may move to block 1305. At block 1305, the current rule variable may be set to the next networking rule in the initial networking rule set before the process loops back to block 1302.

One or more of the initial networking rules may specify one or more range as "ANY". Such networking rules may result in 2-dimensional or 1-dimensional training sets. For example, a firewall rule may allow a small set of clients to access to any destination port of a server. The flow sample produced from such a firewall rule may be a 2-dimensional flow sample that includes a source address field and a destination address field but does not include a destination port field. All the flow samples that only have a source address field and a destination address field may be gathered into a training set. The clustering algorithm may find clusters in that training set and those clusters may be used to produce networking rules that have "ANY" as the matching criterion for the destination port. A similar and separate training set of 2-dimensional flow samples, each having a destination address field and a destination port field, may be produced from the initial networking rules that have "ANY" as their matching criteria for the source address. The clusters found in such a training set may be used to produce networking rules having "ANY" as the matching criterion for the source address. Yet another similar and separate training set of 2-dimensional flow samples, each having a source address field and a destination port field, may be produced from the initial networking rules that have "ANY" as their matching criteria for the destination address. The clusters found in such a training set may be used to produce networking rules having "ANY" as the matching criterion for the destination address.

Some of the initial networking rules may have "ANY" in two of their matching criteria (e.g., allow all traffic from any source to any destination on destination port 443). The flow samples produced from such networking rules may be 1-dimensional. As such, three additional training sets may be produced: one for 1-dimensional flow samples having source address fields; one for 1-dimensional flow samples having destination address fields; and one for 1-dimensional flow samples having destination port fields. The clustering algorithm may identify clusters of 1-dimensional flow samples and the networking rules produced from such clusters may have "ANY" in two of their matching criteria. Note that rules having "ANY" for every field may be errors, may be discarded without producing a flow sample, and may be flagged such that a network engineer may consider why such a rule may be included in an initial networking rule set.

Figure 14:
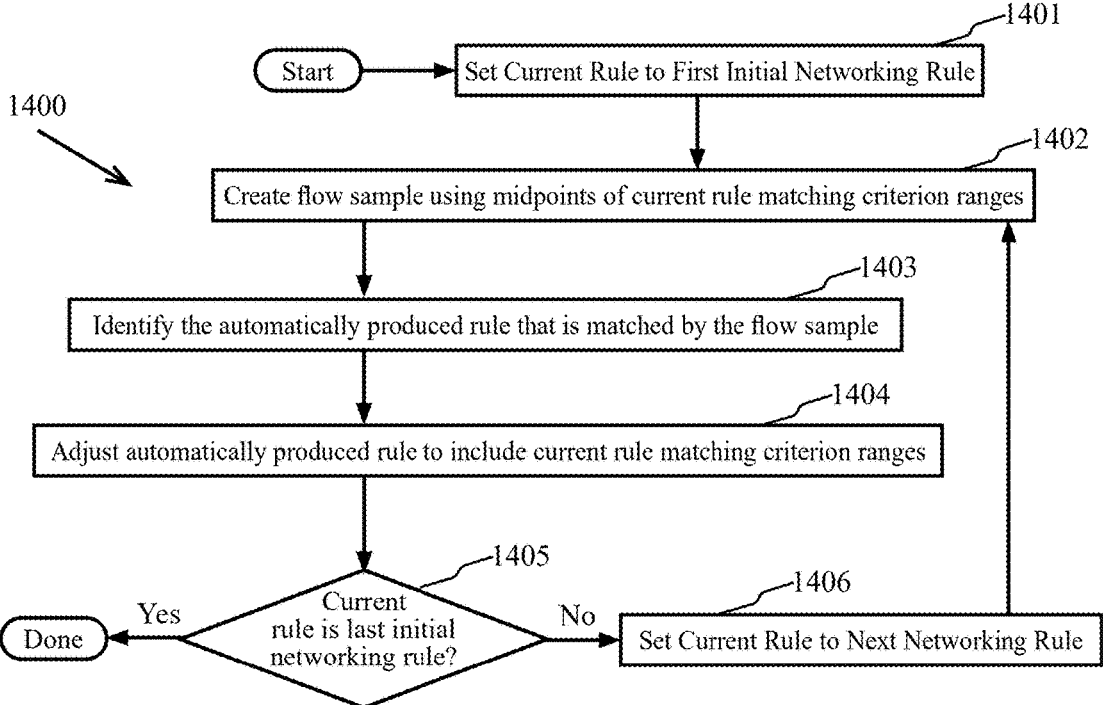
FIG. 14 is a high-level flow diagram illustrating an example of a process for updating a set of networking rules to cover the address and port ranges in an initial set of networking rules, according to some aspects.

FIG. 14 is a high-level flow diagram illustrating an example of a process 1400 for updating a set of networking rules to cover the address and port ranges in an initial set of networking rules, according to some aspects. As shown in FIG. 13, some of the flow samples may have been created from the networking rules in an initial networking rule set. A set of automatically produced networking rules may have then been created using clusters that included those flow samples. The matching criterion of one or more of the automatically produced rules may be adjusted to cover the address and port ranges in the matching criteria of the networking rules in the initial rule set. At block 1401, the current rule variable may be set to the first initial networking rule in the initial networking rule set 107. At block 1402, a flow sample may be created using the midpoints of the current rule matching criterion ranges, as discussed above with respect to block 1302. At block 1403, the automatically produced rule that is matched by the flow sample may be identified by comparing the values in the flow sample to the matching criteria in the rules. At block 1404, the automatically produced rule that matches the flow sample may be adjusted to include the current rule value ranges. For example, adjusting the source address range of the produced rule may include: setting the lowest source address in the automatically produced rule equal to lowest source address in the current rule if the lowest source address in the automatically produced rule is greater than lowest source address in the current rule; and setting the highest source address in the automatically produced rule equal to highest source address in the current rule if the highest source address in the automatically produced rule is less than highest source address in the current rule. The destination address range and the destination port range may be similarly adjusted. The process may be done if the current rule is the last networking rule in the initial networking rule set at decision block 1405, otherwise the process may move to block 1406. At block 1406, the process may set the current rule variable to the next networking rule in the initial networking rule set before the process loops back to block 1402.

An example of a network packet matching a networking may be: the network packet's source IP address is within the source address range of the networking rule's matching criteria; the network packet's destination IP address is within the destination address range of the networking rule's matching criteria; and the network packet's destination port number is within the destination port range of the networking rule's matching criteria. An example of a flow sample matching a networking rule may be: the flow sample's source address value converts to a source address within the source address range of the networking rule's matching criteria; the flow sample's destination address value converts to a destination address within the destination address range of the networking rule's matching criteria; and the flow sample's destination address value converts to a destination port number within the destination port range of the networking rule's matching criteria.

Figure 15:
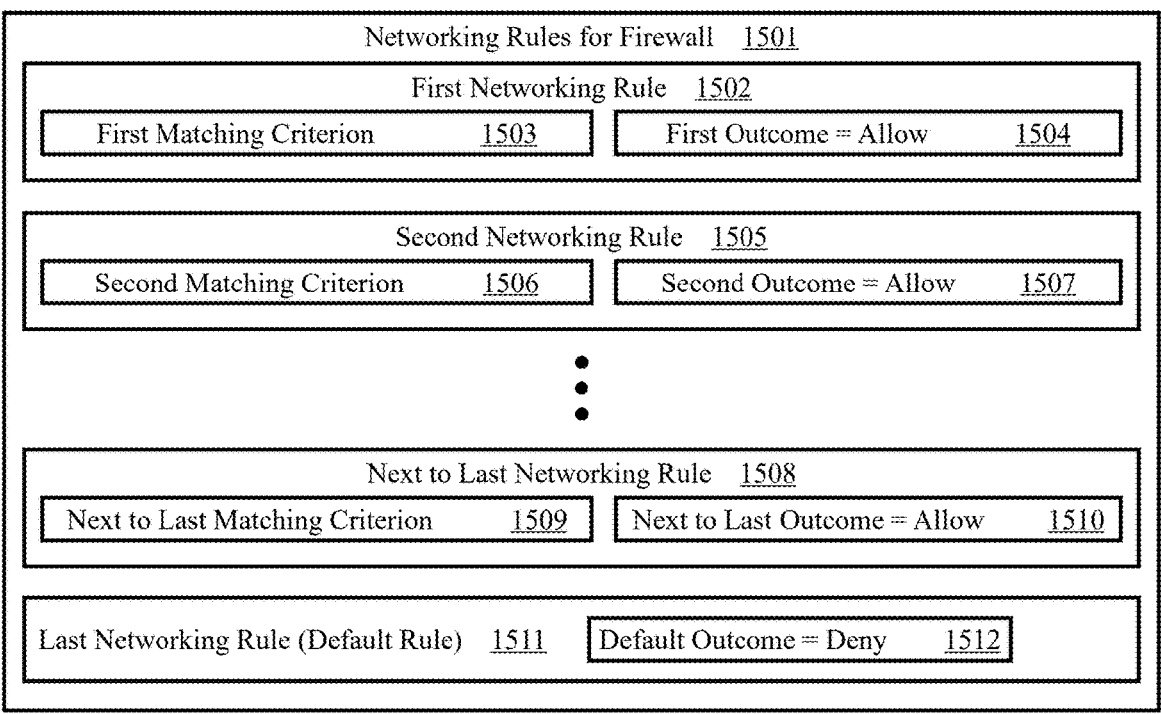
FIG. 15 is a high-level conceptual diagram an example of networking rules that are firewall rules that allow each of the network flows matching a firewall rule other than the default rule and that denies all other network flows, according to some aspects.

FIG. 15 is a high-level conceptual diagram illustrating an example of networking rules that may be firewall rules that allow each of the network flows that match a firewall rule other than the default rule and that deny all other network flows, according to some aspects. The networking rules for a firewall 1501 may include a first networking rule 1502, a second networking rule 1505, a next to last networking rule 1508, and a last networking rule 1511 that may be the default networking rule for the firewall. The first networking rule 1502 may include a first matching criterion 1503 and a first outcome 1504 set to "allow" such that the firewall allows network packets matching the first matching criterion to traverse the firewall. The second networking rule 1505 may include a second matching criterion 1506 and a second outcome 1507 set to "allow" such that the firewall allows network packets matching the second matching criterion to traverse the firewall. The next to last networking rule 1508 may include a next to last matching criterion 1509 and a next to last outcome 1510 set to "allow" such that the firewall allows network packets matching the next to last matching criterion to traverse the firewall. The last networking rule 1511 may be the default networking rule for the firewall. The default networking rule specifies the default outcome 1512 to be applied to each network packet that does not match any of the other networking rules. For a firewall, the default may be "deny" and the firewall drops the packet.

Figure 16:
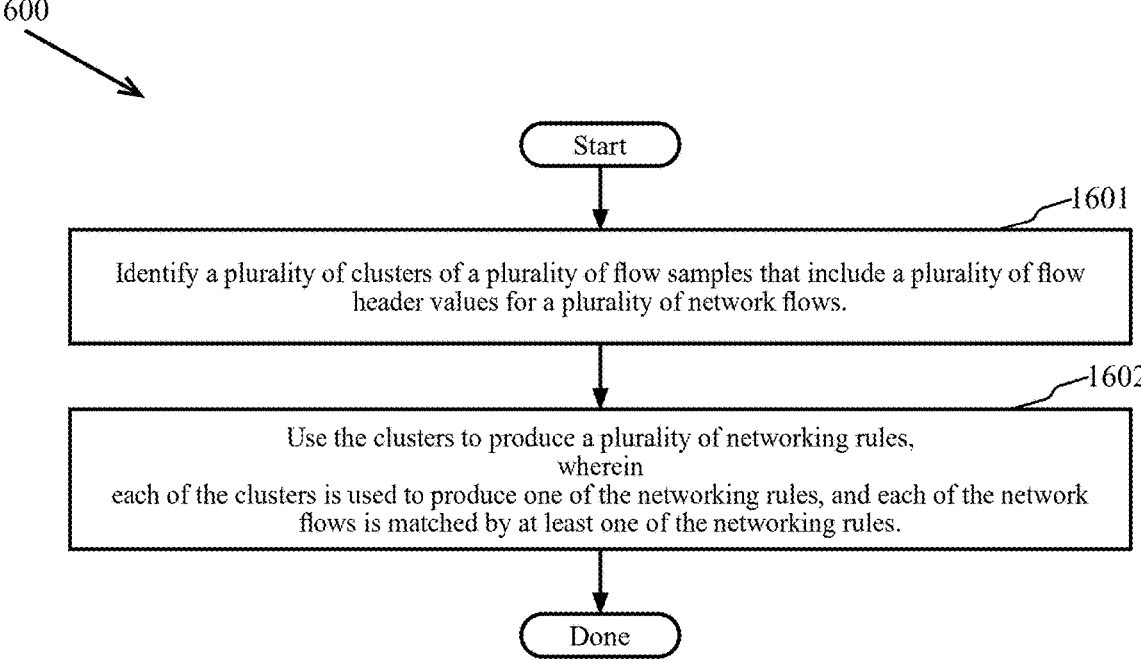
FIG. 16 is a high-level flow diagram illustrating an example of a method for automated network rule production, according to some aspects.

FIG. 16 is a high-level flow diagram illustrating an example of a method 1600 for automated network rule production, according to some aspects. At block 1601, a plurality of clusters of a plurality of flow samples that include a plurality of flow header values for a plurality of network flows may be identified. At block 1602, the clusters may be used to produce a plurality of networking rules, wherein each of the clusters may be used to produce one of the networking rules, and each of the network flows may be matched by at least one of the networking rules.

The processes illustrated in FIGS. 10-14 may be implemented by a computer 501 or a networking device 430. The method illustrated in FIG. 16 may be implemented by a computer 501 or a networking device 430.

Aspects described above may be ultimately implemented in a networking device that includes physical circuits that implement digital data processing, storage, and communications. The networking device may include processing circuits, ROM, RAM, ternary content-addressable memory (TCAM), and at least one interface (interface(s)). The CPU cores described above may be implemented in processing circuits and memory that may be integrated into the same integrated circuit (IC) device as ASIC circuits and memory that may be used to implement the programmable packet processing pipeline. For example, the CPU and other semiconductor chip circuits may be fabricated on the same semiconductor substrate to form a System-on-Chip (SoC). The networking device may be implemented as a single IC device (e.g., fabricated on a single substrate) or the networking device may be implemented as a system that includes multiple IC devices connected by, for example, a printed circuit board (PCB). The interfaces may include network interfaces (e.g., Ethernet interfaces and/or InfiniBand interfaces) and/or PCIe interfaces. The interfaces may also include other management and control interfaces.

Although the operations of the method(s) herein are shown and described in a particular order, the order of the operations of each method may be altered so that certain operations may be performed in an inverse order or so that certain operations may be performed, at least in part, concurrently with other operations. Instructions or sub-operations of distinct operations may be implemented in an intermittent and/or alternating manner.

It may also be noted that at least some of the operations for the methods described herein may be implemented using software instructions stored on a computer usable storage medium for execution by a computer. For example, a computer program product may include a computer usable storage medium to store a computer readable program.

The computer-usable or computer-readable storage medium may be an electronic, magnetic, optical, electromagnetic, infrared, or semiconductor system (or apparatus or device). Examples of non-transitory computer-usable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific examples have been described and illustrated, the scope of the claimed systems, methods, devices, etc. is not to be limited to the specific forms or arrangements of parts so described and illustrated. The scope may be defined by the claims appended hereto and their equivalents.

What is claimed is:

1. A system comprising:
   a processor configured to execute a plurality of executable instructions that implement unsupervised production of a plurality of networking rules, wherein producing the plurality of networking rules includes:
   producing a plurality of flow samples from a plurality of flow log entries, the flow samples including flow header values, where at least one of the flow header values of a flow sample is a single numerical value produced by combining octets of source IP addresses in the flow log entries or by combining octets of destination IP addresses in the flow log entries;
   identifying a plurality of clusters of the flow samples within a multi-dimensional space, wherein each of the flow samples is multi-dimensional and the single numerical value serves as a coordinate for one dimension of a respective flow sample in the multi-dimensional space; and
   producing the plurality of networking rules from the plurality of clusters,
   wherein each one of the plurality of clusters is used to produce one of the plurality of networking rules; and
   the networking rules are configured for use by a networking device that implements the networking rules.

2. The system of claim 1, wherein producing the plurality of networking rules from the plurality of clusters includes producing a cluster description for each of the plurality of clusters, wherein each cluster description includes a least source address value, a greatest source address value, a least destination address value, a greatest destination address value, a least destination port value, and a greatest destination port value derived from the flow samples in the respective cluster.

3. The system of claim 2, wherein each of the plurality of networking rules includes a matching criterion having a source address range set from the least source address value and the greatest source address value in the respective cluster description, a destination address range set from the least destination address value and the greatest destination address value in the respective cluster description, and a destination port range set from the least destination port value and the greatest destination port value in the respective cluster description.

4. The system of claim 1, wherein producing the plurality of flow samples includes selecting flow log entries having an allow outcome.

5. The system of claim 1, wherein a number of the plurality of clusters is based on a flow table size of the networking device.

6. The system of claim 1, wherein the processor is configured to use a nearest-neighbor clustering algorithm to identify the plurality of clusters.

7. The system of claim 1, wherein the processor is configured to use a random cut forest clustering algorithm to identify the plurality of clusters.

8. The system of claim 1, wherein the flow samples are samples of a plurality of network flows, and the plurality of networking rules are firewall rules that allow each of the network flows and that deny a network flow that is not one of the network flows.

9. The system of claim 1, wherein the flow samples are samples of a plurality of network flows, and at least one of the plurality of flow samples are produced from a flow log that has an entry for each of the network flows.

10. The system of claim 1, wherein at least one of the plurality of flow samples are produced from an initial networking rule set that includes a plurality of initial networking rules.

11. The system of claim 10, wherein:

one of the plurality of initial networking rules indicates a range of values; and one of the plurality of flow samples includes a value that is a midpoint of the range of values.

12. The system of claim 11, wherein:

the one of the plurality of flow samples matches one of the plurality of networking rules; and the one of the plurality of networking rules is adjusted to include the range of values.

13. A method comprising:

producing a plurality of flow samples from a plurality of flow log entries, the flow samples including flow header values, where at least one of the flow header values of a flow sample is a single numerical value produced by combining octets of source IP addresses in the flow log entries or by combining octets of destination IP addresses in the flow log entries;

identifying a plurality of clusters of the flow samples within a multi-dimensional space, wherein each of the flow samples is multi-dimensional and the single numerical value serves as a coordinate for one dimension of a respective flow sample in the multi-dimensional space; and producing a plurality of networking rules from the plurality of clusters, wherein:

each of the plurality of clusters is used to produce one of the plurality of networking rules; and the networking rules are configured for use by a networking device that implements the networking rules.

14. The method of claim 13, wherein at least one of the plurality of flow samples is a multi-dimensional flow sample that excludes a field having an ANY matching criterion from an initial networking rule, and the multi-dimensional flow sample is gathered into a separate training set from other flow samples having a different dimensionality.

15. The method of claim 13, further including:

using a nearest-neighbor clustering algorithm to identify the plurality of clusters.

16. The method of claim 13, wherein the flow samples are samples of a plurality of network flows, and the plurality of networking rules are firewall rules that allow each of the network flows and that deny a network flow that is not one of the network flows.

17. The method of claim 13, wherein the flow samples are samples of a plurality of network flows, and at least one of the plurality of flow samples are produced from a flow log that has an entry for each of the network flows.

18. The method of claim 13, wherein at least one of the plurality of flow samples are produced from an initial networking rule set that includes a plurality of initial networking rules.

19. The method of claim 18, wherein:

one of the plurality of initial networking rules indicates a range of values;

one of the plurality of flow samples includes a value that is a midpoint of the range of values;

the one of the plurality of flow samples matches one of the plurality of networking rules; and the one of the plurality of networking rules is adjusted to include the range of values.

20. A system comprising:

a clustering means for identifying a plurality of clusters of a plurality of flow samples within a multi-dimensional space, the plurality of flow samples including a plurality of flow header values of a plurality of network flows; and a means for producing a plurality of networking rules from the plurality of clusters, wherein:

the flow samples are produced from a plurality of flow log entries, the flow header values including a single numerical value produced by combining octets of source IP addresses in the flow log entries or by combining octets of destination IP addresses in the flow log entries;

each of the flow samples is multi-dimensional and the single numerical value serves as a coordinate for one dimension of a respective flow sample in the multi-dimensional space;

each one of the plurality of clusters is used to produce one of the plurality of networking rules; and the networking rules are configured for use by a networking device that implements the networking rules.

21. The system of claim 20, wherein the multi-dimensional space is a 3-dimensional space.

* * * * *